(12) United States Patent
Mitsui et al.

(10) Patent No.: US 10,982,761 B2
(45) Date of Patent: Apr. 20, 2021

(54) LIQUID-PRESSURE DRIVING SYSTEM

(71) Applicant: KAWASAKI JUKOGYO KABUSHIKI KAISHA, Kobe (JP)

(72) Inventors: Hiroaki Mitsui, Kobe (JP); Akihiro Kondo, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/476,782

(22) PCT Filed: Jan. 26, 2018

(86) PCT No.: PCT/JP2018/002471
§ 371 (c)(1),
(2) Date: Jul. 9, 2019

(87) PCT Pub. No.: WO2018/143081
PCT Pub. Date: Aug. 9, 2018

(65) Prior Publication Data
US 2019/0376535 A1 Dec. 12, 2019

(30) Foreign Application Priority Data
Feb. 1, 2017 (JP) .............................. JP2017-016958

(51) Int. Cl.
*F15B 11/08* (2006.01)
*F16H 61/4104* (2010.01)
(Continued)

(52) U.S. Cl.
CPC .......... *F16H 61/4104* (2013.01); *F15B 11/08* (2013.01); *F15B 13/0401* (2013.01);
(Continued)

(58) Field of Classification Search
CPC ................ F15B 13/028; F15B 21/0423; F15B 2211/4159; F15B 2211/62; F16H 61/4104
See application file for complete search history.

(56) References Cited

U.S. PATENT DOCUMENTS 3,150,490 A * 9/1964 Wegerdt .................... B66B 1/24
60/394
4,369,625 A * 1/1983 Izumi .................... E02F 9/2292
414/699

(Continued)

FOREIGN PATENT DOCUMENTS

JP    S62-261702 A    11/1987
JP    2002-130474 A    5/2002
(Continued)

*Primary Examiner* — F Daniel Lopez
*Assistant Examiner* — Matthew Wiblin
(74) *Attorney, Agent, or Firm* — Oliff PLC

(57) ABSTRACT

A liquid-pressure driving system includes: a pump connected to an actuator through two pressure liquid passages; pressurizing mechanisms interposed on the passages and applying pressure to the operating oil returning from the actuator; a low pressure selector valve connected to parts of the passages and introducing to a cooling passage the operating liquid having lower pressure between the operating liquids flowing through the two pressure liquid passages; a restrictor mechanism interposed on the cooling passage; a cooler apparatus interposed on the cooling passage downstream of the restrictor mechanism, the cooler apparatus cooling the operating liquid flowing through the cooling passage; and a pressure liquid returning mechanism connected to parts of the two pressure liquid passages, each of the parts being at one side of the corresponding pressurizing mechanism close to the pump, the pressure liquid returning mechanism returning the cooled operating liquid to the two pressure liquid passages.

5 Claims, 2 Drawing Sheets

(51) Int. Cl.
  *F15B 21/0423* (2019.01)
  *F15B 13/04* (2006.01)
  *F04B 39/06* (2006.01)
  *F15B 13/042* (2006.01)

(52) U.S. Cl.
  CPC .......... *F15B 21/0423* (2019.01); *F04B 39/06* (2013.01); *F15B 13/042* (2013.01)

(56) References Cited

U.S. PATENT DOCUMENTS

| | | | | |
|---|---|---|---|---|
| 4,520,626 A | * | 6/1985 | Nakajima | F15B 7/10 60/468 |
| 5,427,195 A | * | 6/1995 | Paul | B60K 17/30 180/242 |
| 5,941,689 A | * | 8/1999 | Skirde | F04B 49/08 417/32 |
| 6,336,325 B1 | * | 1/2002 | Gluck | F15B 11/0406 60/468 |
| 6,339,928 B1 | * | 1/2002 | Gollner | F16H 57/04 60/464 |
| 9,080,310 B2 | * | 7/2015 | Knussman | E02F 9/2235 |
| 2004/0091363 A1 | * | 5/2004 | Butler | F04B 9/1172 417/46 |
| 2013/0000481 A1 | | 1/2013 | Ohno et al. | |
| 2014/0033692 A1 | * | 2/2014 | Nelson | B60K 6/12 60/327 |
| 2016/0084241 A1 | * | 3/2016 | Sato | B26F 3/004 417/222.1 |
| 2016/0153556 A1 | * | 6/2016 | Kenkel | F16K 11/06 137/1 |
| 2016/0238043 A1 | | 8/2016 | Miyata et al. | |

FOREIGN PATENT DOCUMENTS

| | | |
|---|---|---|
| JP | 5444462 B2 | 3/2014 |
| JP | 5728621 B1 | 6/2015 |
| JP | 2016-061249 A | 4/2016 |

* cited by examiner

LIQUID-PRESSURE DRIVING SYSTEM

TECHNICAL FIELD

The present invention relates to a liquid-pressure driving system including a liquid-pressure pump constituting a closed circuit together with a liquid-pressure actuator.

BACKGROUND ART

One example of an apparatus configured to supply pressure oil to a hydraulic actuator, such as a hydraulic cylinder or a hydraulic motor, to drive the hydraulic actuator is a hydraulic continuously variable transmission. Known as the hydraulic continuously variable transmission is a hydraulic driving apparatus of PTL 1, for example. The hydraulic driving apparatus of PTL 1 includes a hydraulic pump. The hydraulic pump can switch an ejection direction by changing a tilting angle of a swash plate thereof. The hydraulic pump is connected to the hydraulic motor through two main passages and constitutes a closed circuit together with the hydraulic motor. In order to replace operating oil flowing through the closed circuit with operating oil in a tank, the hydraulic driving apparatus includes a low pressure selector valve, a safety valve, and a charge pump. The low pressure selector valve selects a main passage having lower pressure from the two main passages and discharges the operating oil, flowing through the selected main passage having the lower pressure, to the tank through a relief valve. When the pressure in any of the main passages becomes lower than predetermined oil pressure, the safety valve connects this main passage to the charge pump and introduces the operating oil, ejected from the charge pump, to this main passage.

According to the hydraulic driving apparatus configured as above, when the hydraulic pump is driven, the hydraulic pump sucks the operating liquid from one of the main passages and ejects the operating liquid to the other of the main passages. In this case, the pressure of the one main passage becomes lower than the pressure of the other main passage, and the operating oil of the one main passage is discharged to the tank through the low pressure selector valve and the relief valve. With this, a certain amount of operating oil that is a part of the operating oil flowing through the closed circuit is returned to the tank. Further, the pressure of the one main passage becomes lower than the predetermined oil pressure by the discharge of the operating oil, and the operating oil is supplied from the charge pump to the one main passage. With this, the operating liquid is introduced from the tank to the main passage at a certain amount equal to the amount of operating oil discharged. As above, according to the hydraulic driving apparatus, the temperature of the operating oil flowing through the closed circuit can be prevented from excessively increasing by returning a certain amount of operating oil to the tank.

CITATION LIST

Patent Literature

PTL 1: Japanese Patent No. 5728621

SUMMARY OF INVENTION

Technical Problem

As described above, in the hydraulic driving apparatus of PTL 1, the operating oil is returned to the main passage by the charge pump. Therefore, various mechanisms are required for providing the charge pump, and a space for accommodating these mechanisms is also required. Since the hydraulic driving apparatus includes the charge pump, the number of parts increases, and this is a factor that increases the cost of the hydraulic driving apparatus. Further, in the hydraulic driving apparatus, the operating oil ejected from the charge pump when the actuator is in a stop state is discharged to the tank through the safety valve at all times. Therefore, energy loss of the hydraulic driving apparatus is large.

An object of the present invention is to provide a hydraulic driving system capable of cooling operating oil without using a sub pump, such as a charge pump.

Solution to Problem

A liquid-pressure driving system of the present invention is a liquid-pressure driving system in which a main circuit thereof forms a liquid-pressure closed circuit together with a liquid-pressure actuator. The liquid-pressure driving system includes: a liquid-pressure pump connected to the liquid-pressure actuator through two pressure liquid passages and configured to suck a pressure liquid through one of the two pressure liquid passages and eject the pressure liquid through the other of the two pressure liquid passages; pressurizing mechanisms interposed on the respective two pressure liquid passages and configured to apply pressure to the operating oil returning from the liquid-pressure actuator; a low pressure selector valve connected to parts of the two pressure liquid passages, each of the parts being located at one side of the corresponding pressurizing mechanism which side is close to the pressure-liquid actuator, the low pressure selector valve being configured to introduce to a cooling passage the operating liquid having lower pressure between the operating liquids flowing through the two pressure liquid passages; a restrictor mechanism interposed on the cooling passage; a cooler apparatus interposed on the cooling passage so as to be located downstream of the restrictor mechanism, the cooler apparatus being configured to cool the operating liquid flowing through the cooling passage; and a pressure liquid returning mechanism connected to parts of the two pressure liquid passages, each of the parts being located at one side of the corresponding pressurizing mechanism which side is close to the pressure liquid pump, the pressure liquid returning mechanism being configured to return the operating liquid, cooled by the cooler apparatus, to the two pressure liquid passages.

According to the present invention, the low pressure selector valve can connect the other of the two pressure liquid passages to the cooling passage, and the pressurizing mechanism can apply pressure to the operating oil returning from the liquid-pressure actuator to the pressure liquid pump. With this, the operating oil can be introduced to the cooling passage and can be further introduced to the cooler apparatus through the cooling passage. The restrictor mechanism is provided on the cooling passage. Since the pressurizing mechanism applies pressure to the operating oil returning to the pressure liquid pump, the operating oil flows through the cooling passage at a certain flow rate corresponding to the opening degree of the restrictor mechanism. To be specific, when the liquid-pressure actuator is driving, the operating oil can continuously flow through the cooler apparatus at the certain flow rate. The operating liquid cooled by the cooler apparatus is returned to the oil passage by the pressure liquid returning mechanism. Therefore, the operating liquid cooled by the cooler apparatus can be returned to the closed circuit. As above, according to the liquid-pressure driving system, the operating oil can be taken out from the closed circuit at the certain flow rate and be cooled by the cooler apparatus, and the cooled operating oil can be returned to the closed circuit. Therefore, a temperature increase of the operating liquid in the closed circuit can be suppressed. To be specific, according to the liquid-pressure driving system, the operating oil can be supplied to and be cooled by the cooler apparatus at the certain flow rate without using a sub pump, and the operating oil can be returned to the oil passage from the operating oil returning mechanism at the certain flow rate. Therefore, a driving source of the sub pump and various components can be omitted. Thus, the number of parts can be suppressed, and the manufacturing cost can be suppressed. In addition, since the sub pump is not used, the hydraulic driving system can be reduced in size.

In the above invention, the pressure liquid returning mechanism may include a returning passage connected to the two pressure liquid passages, and the returning passage may be connected to the cooler apparatus.

According to the above configuration, the hydraulic driving system can be formed in a closed hydraulic circuit. With this, foreign matters from outside can be prevented from getting into the operating oil.

In the above invention, the liquid-pressure driving system may further include an accumulator connected to the returning passage. The accumulator may maintain the operating liquid, flowing through the returning passage, at preset set pressure.

According to the above configuration, the liquid pressure of the returning passage is maintained at the set pressure by the accumulator. With this, the hydraulic pump can easily draw the pressure liquid to the oil passage, and a sucking ability of the hydraulic pump can be prevented from deteriorating.

In the above invention, the restrictor mechanism may include a variable restrictor configured such that an opening degree thereof is changeable.

According to the above configuration, the flow rate of the operating oil introduced to the cooling passage can be adjusted by changing the opening degree of the variable restrictor.

In the above invention, the pressurizing mechanism may include a first check valve and a second check valve. The first check valve may be opened by the operating liquid flowing from the liquid-pressure pump to the liquid-pressure actuator. The second check valve may open when pressure of the operating liquid flowing from the liquid-pressure pump to the liquid-pressure actuator becomes equal to or higher than predetermined pressure.

According to the above configuration, pressure can be applied to the operating liquid returning from the liquid-pressure actuator to the hydraulic pump.

In the above invention, when differential pressure between liquid pressures of the two pressure liquid passages becomes zero, the low pressure selector valve may be located at a neutral position. At the neutral position, the low pressure selector valve may connect the two pressure liquid passages to each other and also connect the two pressure liquid passages to the cooling passage.

According to the above configuration, the liquid pressure of the liquid-pressure actuator can be released to the cooling passage through the pressure liquid passage and the low pressure selector valve. With this, the liquid-pressure actuator can be depressurized.

Advantageous Effects of Invention

According to the present invention, operating oil can be cooled by a hydraulic pump without using a sub pump.

The above object, other objects, features, and advantages of the present invention will be made clear by the following detailed explanation of preferred embodiments with reference to the attached drawings.

DESCRIPTION OF EMBODIMENTS

Hereinafter, hydraulic driving systems 1 and 1A according to embodiments of the present invention will be described with reference to the drawings. It should be noted that each of the hydraulic driving systems 1 and 1A described below is just one embodiment of the present invention. Therefore, the present invention is not limited to the embodiments. Additions, deletions, and modifications may be made within the scope of the present invention.

Embodiment 1

Figure 1:
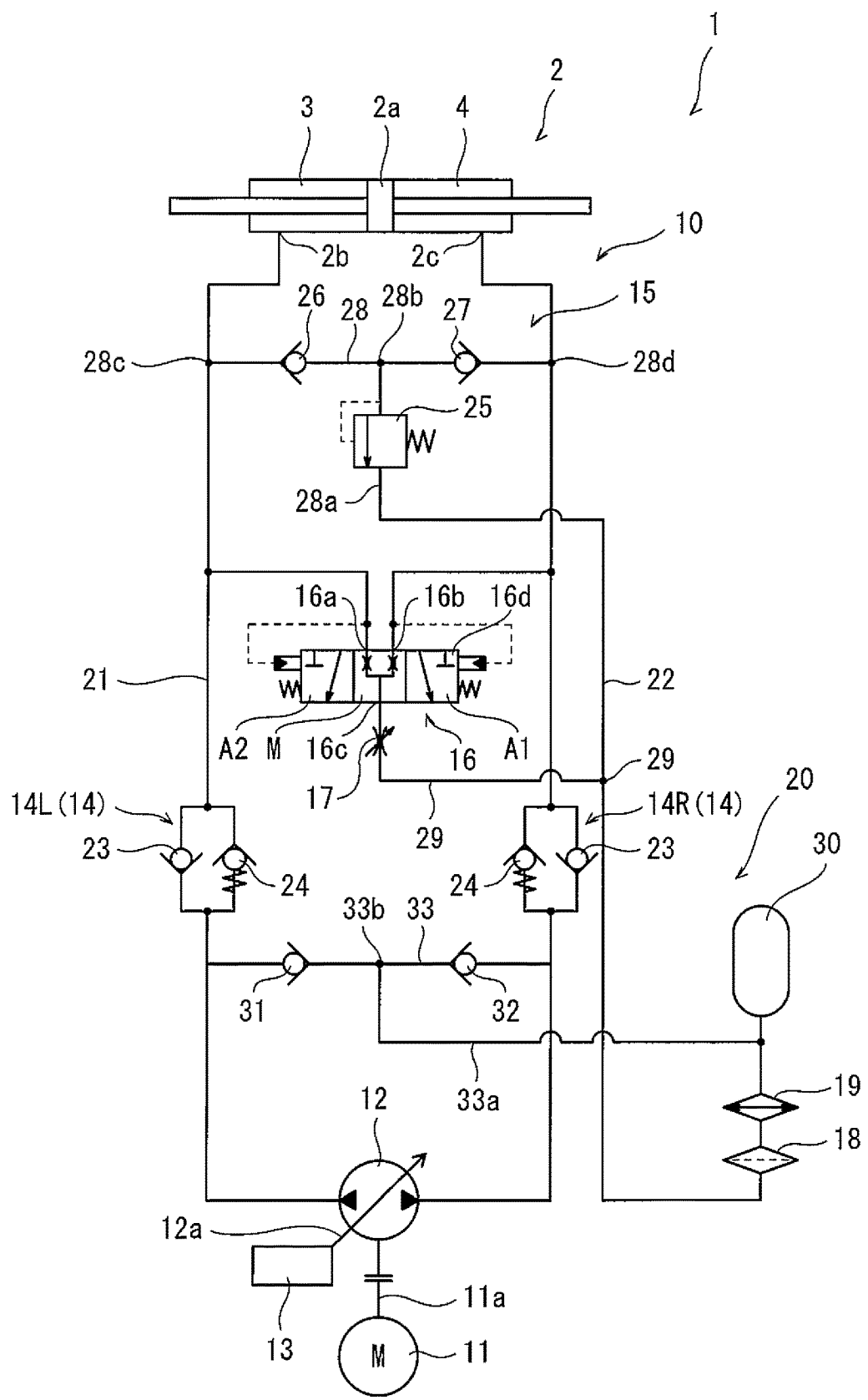
FIG. 1 is a circuit diagram schematically showing a hydraulic driving system of Embodiment 1.
Figure 2:
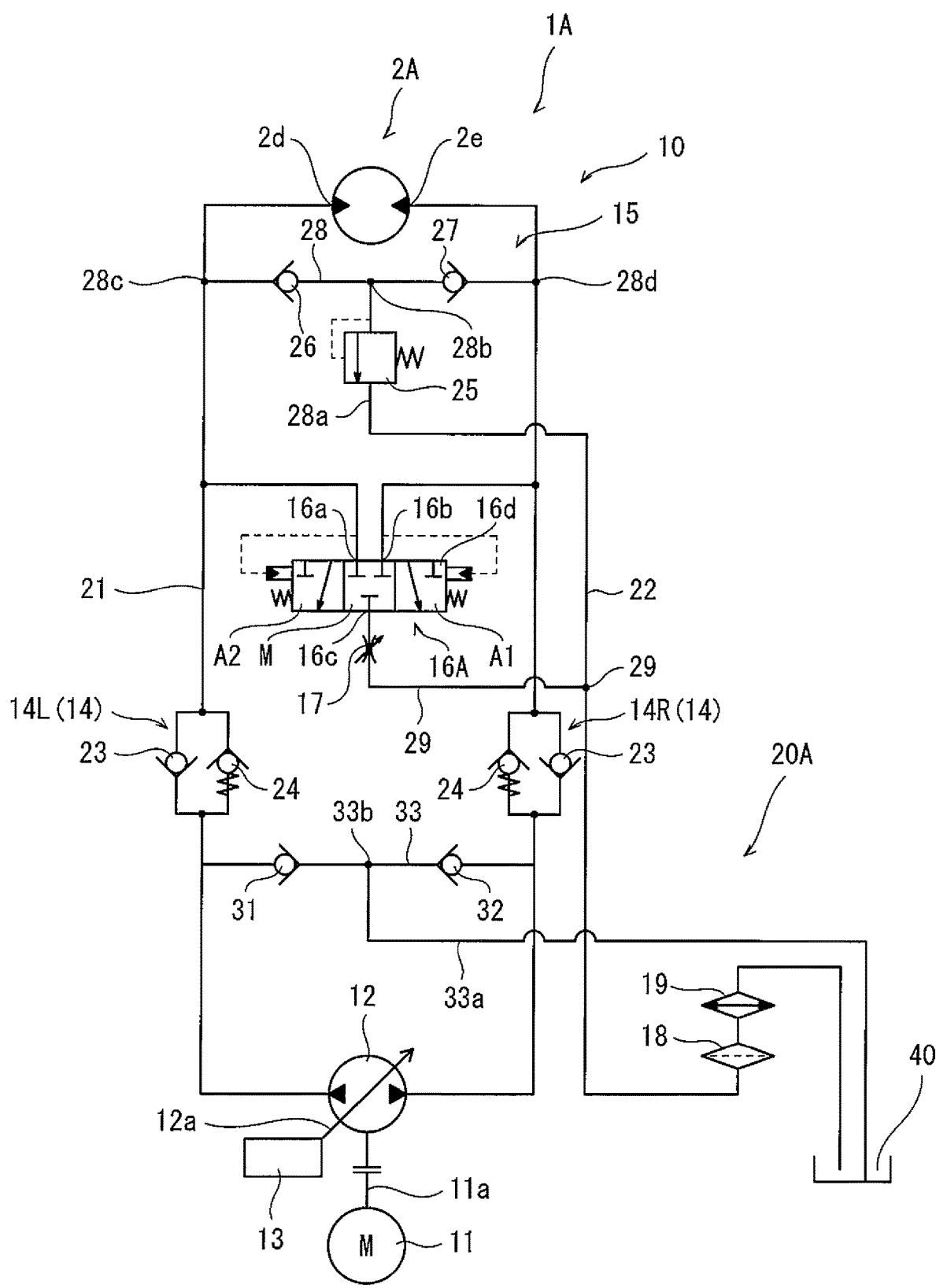
FIG. 2 is a circuit diagram schematically showing the hydraulic driving system of Embodiment 2.

An industrial machine, such as a booster, a crusher, or a carrier, includes a hydraulic actuator (i.e., a liquid-pressure actuator) and can perform work by operating the hydraulic actuator. The hydraulic actuator is, for example, a hydraulic cylinder 2 as shown in FIG. 1, and the hydraulic cylinder 2 is constituted by a double-acting hydraulic cylinder. To be specific, the hydraulic cylinder 2 includes a piston 2a and two oil chambers 3 and 4 separated by the piston 2a. Therefore, according to the hydraulic cylinder 2, when operating oil is supplied to the first oil chamber 3, the piston 2a moves toward a first side in a predetermined direction. When the operating oil is supplied to the second oil chamber 4, the piston 2a moves toward a second side in the predetermined direction. The hydraulic cylinder 2 includes two ports 2b and 2c. The first cylinder port 2b is connected to the first oil chamber 3, and the second cylinder port 2c is connected to the second oil chamber 4. A hydraulic driving system 1 is connected to the hydraulic cylinder 2 so as to supply and discharge the operating oil to and from the oil chambers 3 and 4 through the cylinder ports 2b and 2c.

Hydraulic Driving System

In the hydraulic driving system 1, a main circuit 10 thereof forms a closed circuit together with the hydraulic cylinder 2. The hydraulic driving system 1 includes an electric motor 11, a hydraulic pump 12, a variable displacement mechanism 13, pressurizing mechanisms 14, a relief mechanism 15, a low pressure selector valve 16, a variable restrictor mechanism 17, a filter 18, a cooler apparatus 19, and an operating oil returning mechanism 20. The electric motor 11 is a so-called servo motor or inverter motor and is configured to be able to rotate an output shaft 11a thereof in a normal direction and a reverse direction. The electric motor 11 is connected to a controller (not shown), and the controller controls the rotational direction, rotational speed, rotation amount, and the like of the output shaft 11a. The hydraulic pump 12 is coupled to the output shaft 11a.

The hydraulic pump 12 that is one example of a liquid-pressure pump is a so-called swash plate variable displacement pump and ejects the operating oil at an ejection flow rate corresponding to a tilting angle of a swash plate 12a thereof. The variable displacement mechanism 13 is provided at the swash plate 12a. The variable displacement mechanism 13 changes the tilting angle of the swash plate 12a in accordance with a signal from the controller (not shown) to change the ejection flow rate of the hydraulic pump 12. The hydraulic pump 12 includes two ports 12b and 12c and ejects the operating oil from the port 12b or 12c in accordance with the rotational direction of the output shaft 11a of the electric motor 11. To be specific, when the output shaft 11a of the electric motor rotates in the normal direction, the hydraulic pump 12 sucks the operating oil through the first port 12b and ejects the operating oil through the second port 12c. When the output shaft 11a of the electric motor rotates in the reverse direction, the hydraulic pump 12 sucks the operating oil through the second port 12c and ejects the operating oil through the first port 12b.

The first port 12b of the hydraulic pump 12 configured as above is connected to the first cylinder port 2b of the hydraulic cylinder 2 through a first oil passage 21, and the second port 12c of the hydraulic pump 12 is connected to the second cylinder port 2c of the hydraulic cylinder 2 through a second oil passage 22. Therefore, when the output shaft 11a of the electric motor rotates in the normal direction, the hydraulic pump 12 sucks the operating oil from the first oil chamber 3 of the hydraulic cylinder 2 through the first oil passage 21 and supplies the operating oil to the second oil chamber 4 of the hydraulic cylinder 2 through the second oil passage 22. With this, the piston 2a moves toward the second side in the predetermined direction. On the other hand, when the output shaft 11a of the electric motor rotates in the reverse direction, the hydraulic pump 12 sucks the operating oil from the second oil chamber 4 of the hydraulic cylinder 2 through the second oil passage 22 and supplies the operating oil to the first oil chamber 3 of the hydraulic cylinder 2 through the first oil passage 21. With this, the piston 2a moves toward the first side in the predetermined direction. As above, the hydraulic pump 12 performs the supply and discharge of the operating oil with respect to the hydraulic cylinder 2 through the oil passages 21 and 22. The pressurizing mechanisms 14 are interposed on the respective oil passages 21 and 22.

In order to facilitate the sucking of the operating oil by the hydraulic pump 12, each of the pressurizing mechanisms 14 applies pressure to, i.e., pressurize the operating oil sucked from the hydraulic cylinder 2 to the hydraulic pump 12. More specifically, each of the pressurizing mechanisms 14 includes a first check valve 23 and a second check valve 24, and the first check valve 23 and the second check valve 24 are interposed on the oil passage (21 or 22) in parallel. To be specific, each of the oil passages 21 and 22 branches and joins in the vicinity of the pressurizing mechanism 14. The first check valve 23 and the second check valve 24 are interposed on respective branched passage parts of the oil passage (21 or 22). When the operating oil flows from the hydraulic pump 12 to the hydraulic cylinder 2, the first check valve 23 opens to allow the flow of the operating oil. When the operating oil flows in the opposite direction, the first check valve 23 remains closed to block the flow in the opposite direction.

On the other hand, when the operating oil flows from the hydraulic cylinder 2 to the hydraulic pump 12, the second check valve 24 opens to allow the flow of the operating oil. When the operating oil flows in the opposite direction, the second check valve 24 remains closed to block the flow in the opposite direction. Further, the second check valve 24 is a so-called spring-equipped check valve. When the operating oil flows from the hydraulic cylinder 2 to the hydraulic pump 12, but the pressure of the operating oil is less than predetermined pressure, the second check valve 24 remains closed. To be specific, when the pressure of the operating oil flowing from the hydraulic cylinder 2 to the hydraulic pump 12 is equal to or more than the predetermined pressure, the second check valve 24 opens. With this, when the hydraulic pump 12 sucks the operating oil from the hydraulic cylinder 2 through the first oil passage 21, the second check valve 24 pressurizes the operating oil, which is returning to the hydraulic pump 12 and flowing through an upstream side of the second check valve 24 of the oil passage (21 or 22), to the predetermined pressure or more. In the following description, the pressurizing mechanism 14 interposed on the first oil passage 21 may be referred to as a pressurizing mechanism 14L, and the pressurizing mechanism 14 interposed on the second oil passage 22 may be referred to as a pressurizing mechanism 14R.

These two pressurizing mechanisms 14L and 14R configured as above constitute the above-described main circuit 10 together with the two oil passages 21 and 22 and the hydraulic pump 12. The main circuit 10 is connected to the hydraulic cylinder 2, and with this, constitutes a closed circuit together with the hydraulic cylinder 2. In the main circuit 10 configured as above, the relief mechanism 15 is connected to the oil passages 21 and 22 so as to be located upstream of the pressurizing mechanisms 14L and 14R.

When the oil pressure of the first oil passage 21 exceeds relief pressure, the relief mechanism 15 discharges the operating oil of the oil passage 21. When the oil pressure of the second oil passage 22 exceeds the relief pressure, the relief mechanism 15 discharges the operating oil of the oil passage 22. To be specific, the relief mechanism 15 includes a relief valve 25 and two check valves 26 and 27. The relief valve 25 is connected to the two oil passages 21 and 22 through a relief passage 28. More specifically, the relief passage 28 connects the two oil passages 21 and 22 to each other and branches, and the relief valve 25 is interposed on a branched passage part 28a of the relief passage 28. The check valve 26 is interposed on the relief passage 28 so as to be located at one side of a branch point 28b which side is close to the first oil passage 21. The check valve 27 is interposed on the relief passage 28 so as to be located at the other side of the branch point 28b which side is close to the second oil passage 22. The check valve 26 opens with respect to the flow of the operating oil from the oil passage 21 to the relief valve 25 and closes with respect to the flow in the opposite direction. The check valve 27 opens with respect to the flow of the operating oil from the oil passage 22 to the relief valve 25 and closes with respect to the flow in the opposite direction. Therefore, the operating oil having higher pressure between the operating oil flowing through the oil passage 21 and the operating oil flowing through the oil passage 22 is introduced to the relief valve 25. When the pressure of the operating oil introduced to the relief valve 25 exceeds the relief pressure, the relief valve 25 opens the relief passage 28 to discharge the operating oil. The relief passage 28 is connected to a cooling passage 29 at a downstream side of the relief valve 25. The low pressure selector valve 16 is connected to the cooling passage 29. Further, the low pressure selector valve 16 is connected between the pressurizing mechanism 14L of the first oil passage 21 and a connecting point 28c of the relief passage 28 and is also connected between the pressurizing mechanism 14R of the second oil passage 22 and a connecting point 28d of the relief passage 28.

The low pressure selector valve 16 is a valve configured to select the operating oil having lower pressure from the operating oil flowing through the first oil passage 21 and the operating oil flowing through the second oil passage 22 and output the selected operating oil having the lower pressure. To be specific, the low pressure selector valve 16 includes three ports 16a to 16c. The first port 16a is connected to the first oil passage 21. The second port 16b is connected to the second oil passage 22, and the third port 16c is connected to the cooling passage 29. Further, the low pressure selector valve 16 includes a spool 16d, and the spool 16d is configured to be movable in an axial direction thereof. The spool 16d receives the oil pressure of the first oil passage 21 and the oil pressure of the second oil passage 22 such that the oil pressure of the first oil passage 21 and the oil pressure of the second oil passage 22 act against each other. The spool 16d changes its position in accordance with a differential pressure that is a difference between the oil pressure of the first oil passage 21 and the oil pressure of the second oil passage 22. According to the low pressure selector valve 16, when the position of the spool 16d changes, connection statuses of the three ports 16a to 16c change.

More specifically, when the oil pressure of the first oil passage 21 and the oil pressure of the second oil passage 22 are equal to each other, the spool 16d is located at a neutral position M. At the neutral position M, the three ports 16a to 16c are connected to one another, and restrictors are formed with respect to the first port 16a and the second port 16b. It should be noted that the restrictors do necessarily not have to be formed and may be omitted. With this, the oil pressure of the first oil passage 21 and the oil pressure of the second oil passage 22 can be kept equal to each other after a small amount of time, and the oil pressure of the oil chamber 3 and the oil pressure of the oil chamber 4 in the hydraulic cylinder 2 can be reduced (i.e., the oil chambers 3 and 4 can be depressurized). On the other hand, when the oil pressure of the second oil passage 22 is higher than the oil pressure of the first oil passage 21, the spool 16d moves to a first offset position A1. At the first offset position A1, the second oil passage 22 is blocked, and the first oil passage 21 is connected to the cooling passage 29. With this, the operating oil flowing through the first oil passage 21 can be discharged to the cooling passage 29. Further, when the oil pressure of the second oil passage 22 is lower than the oil pressure of the first oil passage 21, the spool 16d moves to a second offset position A2. At the second offset position A2, the first oil passage 21 is blocked, and the second oil passage 22 is connected to the cooling passage 29. With this, the operating oil flowing through the second oil passage 22 can be discharged to the cooling passage 29. The variable restrictor mechanism 17 is interposed on the cooling passage 29, through which the operating oil is discharged, so as to be located upstream of a connecting point 29a where the cooling passage 29 and the relief passage 28 are connected to each other.

The variable restrictor mechanism 17 is constituted by a variable restrictor configured to be able to change the setting of an opening degree thereof. The operating oil flows through the cooling passage 29 at a downstream side of the variable restrictor mechanism 17 at a flow rate corresponding to the opening degree set in the variable restrictor mechanism 17 and differential pressure before and after the variable restrictor mechanism 17. The filter 18 and the cooler apparatus 19 are interposed on the cooling passage 29 so as to be located downstream of the connecting point 29a.

The filter 18 removes foreign matters from the operating oil flowing through the cooling passage 29. The cooler apparatus 19 is a water-cooled or air-cooled oil cooler and cools the operating oil introduced to the cooler apparatus 19 through the filter 18. The operating oil returning mechanism 20 is provided at the cooling passage 29.

The operating oil returning mechanism 20 returns the operating oil, cooled by the cooler apparatus 19, to the passages 21 and 22. The operating oil returning mechanism 20 includes an accumulator 30 and two check valves 31 and 32. The accumulator 30 is connected to the two oil passages 21 and 22 through a returning passage 33. To be specific, the returning passage 33 connects a part of the oil passage 21 which part is located at one side of the pressurizing mechanism 14L which side is close to the hydraulic pump 12 and a part of the oil passage 22 which part is located at one side of the pressurizing mechanism 14R which side is close to the hydraulic pump 12. Further, the returning passage 33 branches, and the accumulator 30 and the cooling passage 29 are connected to a branched passage part 33a of the returning passage 33. The check valve 31 is interposed on the returning passage 33 so as to be located at one side of a branch point 33b which side is close to the first oil passage 21. The check valve 32 is interposed on the returning passage 33 so as to be located at the other side of the branch point 33b which side is close to the second oil passage 22. The check valve 31 opens with respect to the flow of the operating oil from the branch point 33b to the oil passage 21 and closes with respect to the flow in the opposite direction. The check valve 32 opens with respect to the flow of the operating oil from the branch point 33b to the oil passage 22 and closes with respect to the flow in the opposite direction. The accumulator 30 is configured to be able to accumulate preset set pressure (<predetermined pressure) and maintains the oil pressure of the returning passage 33 at the set pressure. With this, the operating oil cooled by the cooler apparatus 19 easily returns to the passages 21 and 22 through the returning passage 33.

Operations of Hydraulic Driving System

When the output shaft 11a of the electric motor 11 is rotated by the controller (not shown) in, for example, the normal direction, the hydraulic driving system 1 configured as above functions as below. To be specific, the hydraulic pump 12 sucks the operating oil from the first oil passage 21 and ejects the operating oil to the second oil passage 22 at a flow rate corresponding to the tilting angle of the swash plate 12a. The ejected operating oil is introduced to the second oil chamber 4 through the second oil passage 22 and the first check valve 23 of the pressurizing mechanism 14R, and the piston 2a moves toward the second side in the predetermined direction. By the movement of the piston 2a, the operating oil in the first oil chamber 3 is discharged through the first cylinder port 2b to the first oil passage 21. The operating oil discharged to the first oil passage 21 is introduced to the pressurizing mechanism 14L of the first oil passage 21. The pressurizing mechanism 14L applies pressure by the second check valve 24 (spring-equipped check valve) to the operating oil flowing through the first oil passage 21 from the hydraulic cylinder 2 to the hydraulic pump 12. When the pressure of the operating oil becomes equal to or higher than the predetermined pressure, the second check valve 24 opens, and the operating oil flows from the hydraulic cylinder 2 to the hydraulic pump 12. Therefore, the operating oil flowing through an upstream part of the first oil passage 21 is pressurized to have the predetermined pressure or more, i.e., a part of the first oil passage 21 which part is located at one side of the pressurizing mechanism 14L which side is close to the hydraulic cylinder 2 is pressurized to have the predetermined pressure or more.

In the hydraulic driving system 1, when the operating oil is ejected from the hydraulic pump 12 to the second oil passage 22, the oil pressure of the second oil passage 22 becomes higher than the oil pressure of the first oil passage 21, and the spool 16*d* of the low pressure selector valve 16 moves to the first offset position A1. Therefore, a part of the operating oil discharged to the first oil passage 21 flows to the variable restrictor mechanism 17 of the cooling passage 29 through the low pressure selector valve 16. At an upstream side of the variable restrictor mechanism 17, the predetermined pressure is maintained by the pressurizing mechanism 14. At a downstream side of the variable restrictor mechanism 17, the set pressure is maintained by the accumulator 30. To be specific, the differential pressure before and after the variable restrictor mechanism 17 is kept constant, and the variable restrictor mechanism 17 supplies the operating oil to a downstream side at a certain flow rate corresponding to the opening degree. As above, the variable restrictor mechanism 17 can introduce the operating oil from the first oil passage 21 to the cooling passage 29 at the certain flow rate corresponding to the opening degree. The flow rate of the operating oil introduced can be changed by changing the opening degree of the variable restrictor mechanism 17.

The operating oil introduced to the cooling passage 29 flows through the filter 18 to reach the cooler apparatus 19, and is cooled by the cooler apparatus 19. After the operating oil is cooled by the cooler apparatus 19, the operating oil flows from the cooling passage 29 to the returning passage 33. Regarding the two oil passages 21 and 22 to which the returning passage 33 is connected, the operating oil is sucked from the first oil passage 21 by the hydraulic pump 12, and the high-pressure operating oil is ejected from the hydraulic pump 12 to the second oil passage 22. With this, the oil pressure of the first oil passage 21 becomes lower than the pressure (i.e., the set pressure) accumulated by the accumulator 30, and the oil pressure of the second oil passage 22 becomes higher than the pressure (i.e., the set pressure) accumulated by the accumulator 30. Therefore, only the check valve 31 out of the two check valves 31 and 32 opens, and the operating oil introduced from the returning passage 33 returns to the first oil passage 21 through the check valve 31 again. With this, the operating oil cooled by the cooler apparatus 19 joins the operating oil flowing through the pressurizing mechanism 14L. The operating oil joined as above is sucked by the hydraulic pump 12 from the first oil passage 21 and is ejected to the second oil passage 22 as described above.

The hydraulic driving system 1 configured to operate as above forms a hydraulic closed circuit together with the hydraulic cylinder 2 as described above. Therefore, the hydraulic pump 12 ejects the operating oil at the flow rate basically equal to the flow rate of the sucked operating oil. Further, the hydraulic cylinder 2 discharges the operating oil from the third oil chamber 3 at the flow rate equal to the flow rate of the operating oil supplied to the second oil chamber 4. On this account, when the operating oil is introduced from the first oil passage 21 to the cooling passage 29, the flow rate of the operating oil flowing through the pressurizing mechanism 14 becomes smaller than the flow rate of the sucked operating oil by the flow rate of the operating oil introduced to the cooling passage 29. In order to compensate the shortage of the operating oil, the operating oil is drawn from the returning passage 33 to the first oil passage 21. Therefore, the operating oil flows from the returning passage 33 to the first oil passage 21 at the flow rate substantially equal to the flow rate of the operating oil flowing from the first oil passage 21 to the cooling passage 29, i.e., at the flow rate substantially equal to the above-described certain flow rate. As above, when driving the hydraulic cylinder 2, the operating oil can be cooled by the cooler apparatus 19 at the certain flow rate, and the cooled operating oil can be returned to the first oil passage 21. With this, a temperature increase of the operating liquid in the closed circuit can be suppressed.

The following will briefly describes a case where the output shaft 11*a* of the electric motor 11 is rotated in the reverse direction by the controller (not shown). In this case, the operating oil flows in a direction opposite to the direction in which the operating oil flows when the output shaft 11*a* rotates in the normal direction. Then, the piston 2*a* moves toward the first side in the predetermined direction. With this, the operating oil is discharged from the second oil chamber 4, and the operating oil discharged by the pressurizing mechanism 14R is pressurized to have the predetermined pressure. Further, when the pressure of the first oil passage 21 becomes high, the operating oil discharged from the second oil chamber 4 is introduced to the variable restrictor mechanism 17 of the cooling passage 29 through the low pressure selector valve 16. As with when the output shaft 11*a* rotates in the normal direction, the operating oil is discharged from the second oil chamber 4 to the cooling passage 29 at the flow rate corresponding to the opening degree of the variable restrictor mechanism 17, and further flows through the filter 18 to reach the cooler apparatus 19. The operating oil is cooled by the cooler apparatus 19. Then, the operating oils flows through the check valve 32, returns to the second oil passage 22 from the returning passage 33, and joins the operating oil flowing through the pressurizing mechanism 14R. The operating oil that joins as above is sucked by the hydraulic pump 12 through the second oil passage 22 together with the operating oil flowing through the pressurizing mechanism 14R, and is then ejected to the first oil passage 21 as described above. As above, the operating oil flowing in the closed circuit can flow to and be cooled by the cooler apparatus 19 at the certain flow rate, and the cooled operating oil can be returned to the second oil passage 22. With this, the temperature increase of the operating liquid in the closed circuit can be suppressed.

As above, the hydraulic driving system 1 does not use a sub pump, such as a charge pump included in a hydraulic driving apparatus of conventional art. In the hydraulic driving system 1, the operating oil can be supplied to the cooler apparatus 19 at the certain flow rate, and the hydraulic pump 12 can return the operating oil from the operating oil returning mechanism 20 at the certain flow rate. Therefore, a driving source of the sub pump and various components can be omitted. Thus, the number of parts can be suppressed, and the manufacturing cost can be suppressed. In addition, since the sub pump is not used, the hydraulic driving system 1 can be reduced in size.

Although not shown, in the hydraulic driving system 1, for example, a drain port of the hydraulic pump 12 and the returning passage 33 are connected to each other. With this, the operating oil leaking from various components in the hydraulic pump 12 is introduced to the returning passage 33, and the operating oil is also introduced to the returning passage 33 from portions other than the first oil passage 21 and the second oil passage 22. Further, since the oil pressure of the returning passage 33 is maintained at the set pressure by the accumulator 30, the hydraulic pump 12 can easily draw the operating oil from the returning passage 33 to the oil passages 21 and 22. Therefore, a decrease in sucking ability of the hydraulic pump 12 due to, for example, an arrangement position of the returning passage 33 can be suppressed.

In the hydraulic driving system 1, since the cooling passage 29 and the returning passage 33 are connected to each other, the hydraulic driving system 1 can be formed in a closed hydraulic circuit. With this, foreign matters from outside can be prevented from getting into the operating oil.

In the hydraulic driving system 1, when the electric motor 11 stops, and therefore, the hydraulic pump 12 stops, the oil pressure of the hydraulic passage 21 and the oil pressure of the hydraulic passage 22 are balanced, and the piston 2a stops. Then, the low pressure selector valve 16 returns to the neutral position M, and the two hydraulic passages 21 and 22 are connected to each other through the low pressure selector valve 16 and are also connected to the cooling passage 29. With this, the oil pressure of the oil chamber 3 and the oil pressure of the oil chamber 4 can be released to the cooling passage 29 through the two oil passages 21 and 22. Thus, the oil chambers 3 and 4 can be depressurized.

Embodiment 2

The hydraulic driving system 1A of Embodiment 2 is similar in configuration to the hydraulic driving system 1 of Embodiment 1. Therefore, regarding the configuration of the hydraulic driving system 1A of Embodiment 2, differences from the hydraulic driving system 1 of Embodiment 1 will be mainly described. The same reference signs are used for the same components, and a repetition of the same explanation is avoided.

In the hydraulic driving system 1A of Embodiment 2, a hydraulic motor 2A is connected to the first oil passage 21 and the second oil passage 22. The hydraulic motor 2A that is one example of the liquid-pressure actuator includes two supply/discharge ports 2d and 2e. When the operating oil is supplied to the first supply/discharge port 2d, the hydraulic motor 2A rotates in the normal direction. When the operating oil is supplied to the second supply/discharge port 2e, the hydraulic motor 2A rotates in the reverse direction. The hydraulic motor 2A rotates at a speed corresponding to the flow rate of the operating oil supplied to one of the supply/discharge ports 2d and 2e and discharges the operating oil through the other of the supply/discharge ports 2e and 2d at the flow rate substantially equal to the flow rate of the supplied operating oil. The hydraulic motor 2A configured as above rotates by receiving the supply of the operating oil from the hydraulic driving system 1A.

The hydraulic driving system 1A is a so-called hydraulic continuously variable transmission and forms a closed circuit together with the hydraulic motor 2A. The hydraulic driving system 1A includes the electric motor 11, the hydraulic pump 12, the variable displacement mechanism 13, the pressurizing mechanisms 14, the relief mechanism 15, a low pressure selector valve 16A, the variable restrictor mechanism 17, the filter 18, the cooler apparatus 19, and an operating oil returning mechanism 20A. The low pressure selector valve 16A is a value configured to select the operating oil having lower pressure from the operating oil flowing through the first oil passage 21 and the operating oil flowing through the second oil passage 22. When the spool 16d is located at the neutral position M, all the ports 16a to 16c are blocked.

In the hydraulic driving system 1A, the operating oil returning mechanism 20A is connected to a tank 40 at a downstream side of the cooler apparatus 19, and the operating oil cooled by the cooler apparatus 19 is discharged to the tank 40. The returning passage 33A is connected to the cooling passage 29 through the tank 40. The operating oil is drawn from the tank 40 to the returning passage 33A by sucking force generated when the hydraulic pump 12 sucks the operating oil form each of the oil passages 21 and 22. With this, the operating oil cooled by the cooler apparatus 19 can be returned to each of the oil passages 21 and 22 through the tank 40. Further, two check valves 31 and 32 are interposed on the returning passage 33A, and the operating oil returning mechanism 20A is constituted by these two check valves 31 and 32.

The hydraulic driving system 1A configured as above operates in substantially the same manner as the hydraulic driving system 1 of Embodiment 1 except that: the operating oil cooled by the cooler apparatus 19 is discharged to the tank 40; and when sucking the operating oil by the hydraulic pump 12 from each of the oil passages 21 and 22, a certain amount of operating oil is sucked from the tank 40 through the returning passage 33A. The hydraulic driving system 1A has the same operational advantages as the hydraulic driving system 1 of Embodiment 1.

Other Embodiments

In each of the hydraulic driving systems 1 and 1A of Embodiments 1 and 2, the electric motor 11 is used as a driving source. However, the driving source is not necessarily limited to the electric motor 11 capable of rotating in both directions. For example, the driving source may be an electric motor, an engine, or the like capable of rotating in one direction and is only required to rotate the hydraulic pump 12. When using the driving source capable of rotating its output shaft in one direction, such as the electric motor or engine capable of rotating in one direction, the hydraulic pump 12 configured as below is adopted. To be specific, the hydraulic pump 12 is configured to be able to eject the operating oil to the two ports 12b and 12c by changing the tilting angle of the swash plate 12a.

In each of the hydraulic driving systems 1 and 1A of Embodiments 1 and 2, the swash plate variable displacement pump is adopted as the hydraulic pump 12. However, the hydraulic pump 12 is not necessarily limited to such pump. For example, a fixed displacement pump may be adopted as the hydraulic pump 12, or an inclined shaft hydraulic pump may be adopted instead of a swash plate hydraulic pump.

Each of the hydraulic driving systems 1 and 1A of Embodiments 1 and 2 includes the accumulator 30 but does not necessarily have to include the accumulator 30. When the accumulator 30 is not included, the oil pressure of the returning passage 33 decreases, and the sucking ability slightly deteriorates, but the operating oil can be supplied to the cooler apparatus 19.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 1, 1A hydraulic driving system
2 hydraulic cylinder 2A hydraulic motor
12 hydraulic pump
14L, 14R pressurizing mechanism
16 low pressure selector valve
17 variable restrictor mechanism
19 cooler apparatus
20, 20A operating oil returning mechanism
21 first oil passage
22 second oil passage
23 first check valve
24 second check valve
29, 29A cooling passage
30 accumulator
33, 33A returning passage

The invention claimed is:

1. A liquid-pressure driving system in which a main circuit thereof forms a liquid-pressure closed circuit together with a liquid-pressure actuator, the liquid-pressure driving system comprising:
   a liquid-pressure pump connected to the liquid-pressure actuator through two pressure liquid passages and configured to suck a pressure liquid through one of the two pressure liquid passages and eject the pressure liquid through the other of the two pressure liquid passages;
   pressurizing mechanisms interposed on the respective two pressure liquid passages and configured to apply pressure to the pressure liquid returning from the liquid-pressure actuator;
   a low pressure selector valve connected to parts of the two pressure liquid passages, each of the parts being located at one side of the corresponding pressurizing mechanism which is close to the liquid-pressure actuator, the low pressure selector valve being configured to introduce the pressure liquid having lower pressure between the pressure liquid flowing through the two pressure liquid passages to a cooling passage;
   a restrictor mechanism interposed on the cooling passage;
   a cooler apparatus interposed on the cooling passage downstream of the restrictor mechanism, the cooler apparatus being configured to cool the pressure liquid flowing through the cooling passage; and
   a pressure liquid returning mechanism connected to parts of the two pressure liquid passages, each of the parts being located at one side of the corresponding pressurizing mechanism which is close to the liquid-pressure pump, the pressure liquid returning mechanism being configured to return the pressure liquid, cooled by the cooler apparatus, to the two pressure liquid passages, wherein:
   the pressure liquid returning mechanism includes a returning passage connected to the two pressure liquid passages;
   the returning passage is connected to the cooler apparatus; and
   the liquid-pressure driving system returns the pressure liquid, cooled by the cooler apparatus, without using a sub-pump.

2. The liquid-pressure driving system according to claim 1, further comprising an accumulator connected to the returning passage, wherein
   the accumulator maintains the pressure liquid, flowing through the returning passage, at a preset set pressure.

3. The liquid-pressure driving system according to claim 1, wherein the restrictor mechanism includes a variable restrictor configured such that an opening degree thereof is changeable.

4. The liquid-pressure driving system according to claim 1, wherein:
   the pressurizing mechanism includes a first check valve and a second check valve;
   the first check valve is opened by the pressure liquid flowing from the liquid-pressure pump to the liquid-pressure actuator; and
   the second check valve opens when the pressure of the pressure liquid flowing from the liquid-pressure actuator to the liquid-pressure pump becomes equal to or higher than predetermined pressure.

5. The liquid-pressure driving system according to claim 1, wherein:
   when differential pressure between liquid pressures of the two pressure liquid passages becomes zero, the low pressure selector valve is located at a neutral position; and
   at the neutral position, the low pressure selector valve connects the two pressure liquid passages to each other and also connects the two pressure liquid passages to the cooling passage.

* * * * *